(12) United States Patent
Babu et al.

(10) Patent No.: US 10,521,326 B2
(45) Date of Patent: *Dec. 31, 2019

(54) SYSTEM AND METHOD FOR ANALYZING BIG DATA ACTIVITIES

(71) Applicant: Unravel Data Systems, Inc., Menlo Park, CA (US)

(72) Inventors: Shivnath Babu, Durham, NC (US); Kunal Agarwal, Palo Alto, CA (US)

(73) Assignee: Unravel Data Systems, Inc., Menlo Park, CA (US)

(*) Notice: Subject to any disclaimer, the term of this patent is extended or adjusted under 35 U.S.C. 154(b) by 34 days.

This patent is subject to a terminal disclaimer.

(21) Appl. No.: 15/989,938

(22) Filed: May 25, 2018

(65) Prior Publication Data

US 2018/0276101 A1 Sep. 27, 2018

Related U.S. Application Data

(63) Continuation of application No. 15/047,554, filed on Feb. 18, 2016, now Pat. No. 9,983,973.

(60) Provisional application No. 62/117,902, filed on Feb. 18, 2015.

(51) Int. Cl.
| | | |
|---|---|---|
| *G06F 11/00* | (2006.01) | |
| *G06F 11/34* | (2006.01) | |
| *G06F 11/30* | (2006.01) | |
| *G06F 16/11* | (2019.01) | |
| *G06F 16/182* | (2019.01) | |

(52) U.S. Cl.
CPC ........ *G06F 11/3495* (2013.01); *G06F 11/302* (2013.01); *G06F 16/122* (2019.01); *G06F 16/182* (2019.01)

(58) Field of Classification Search
CPC .................................................. G06F 11/3495
USPC ..................... 714/47.1, 37, 38.1, 38.13, 48
See application file for complete search history.

(56) References Cited

U.S. PATENT DOCUMENTS

| | | | | |
|---|---|---|---|---|
| 7,437,614 B2* | 10/2008 | Haswell | .............. | G06F 11/3684 714/38.13 |
| 2005/0010578 A1* | 1/2005 | Doshi | ................. | G06F 11/3419 |
| 2013/0254196 A1* | 9/2013 | Babu | ................... | G06F 11/3404 707/736 |

(Continued)

*Primary Examiner* — Dieu Minh T Le
(74) *Attorney, Agent, or Firm* — Steptoe & Johnson LLP; Robert Greenfeld

(57) ABSTRACT

A system and method for analyzing big data activities are disclosed. According to one embodiment, a system comprises a distributed file system for the entities and applications, wherein the applications include one or more of script applications, structured query language (SQL) applications, Not Only (NO) SQL applications, stream applications, search applications, and in-memory applications. The system further comprises a data processing platform that gathers, analyzes, and stores data relating to entities and applications. The data processing platform includes an application manager having one or more of a MapReduce Manage, a script applications manager, a structured query language (SQL) applications manager, a Not Only (NO) SQL applications manager, a stream applications manager, a search applications manager, and an in-memory applications manager. The application manager identifies if the applications are one or more of slow-running, failed, killed, unpredictable, and malfunctioning.

28 Claims, 23 Drawing Sheets

(56) References Cited

U.S. PATENT DOCUMENTS

2014/0304294 A1* 10/2014 Sharma ................ G06F 16/172
  707/769
2016/0085809 A1* 3/2016 de Castro Alves .........................
  G06F 16/24568
  707/736
2016/0162588 A1* 6/2016 Tuchman ............ G06F 16/3344
  707/722

* cited by examiner

EVENTS PANEL
1 EVENTS FOUND

| HIVE | hue_20140206145959_55a6fab7-1560-45a4-909d-c21

A MAPREDUCE JOB IN THIS QUERY WAS KILLED

Data skew in join of expressions 'r.ads[4]' and 'w.ads[4]'. Some reduce tasks are processing much more data than others. 61200 seconds are wasted due to skew.

Set hive.optimize.skewjoin to true to enable skew-aware join processing. Use the query's Where clause to filter out any values not needed in the join. Use the following parameters to fine-tune Hive's skew-aware join processing: hive.skewjoin.key (current value is 100000). hive.skewjoin.mapjoin.min.split (current value is 33554432). hive.skewjoin.mapjoin.map.tasks (current value is 10000)

*FIG. 3*

| 1 | H | HIVE QUERY |
|---|---|---|
| EVENTS | SUCCESS | ⚙ HADOOP ⊙ FINANCIAL ⊘ 12 NOV 09:12 PST |
| | | ⌂ HADOOP 20141112171212 BA6E9984-DE1B-432B-8799-1FCC... |

🔍 Search by job or user  |  DURATION 3m 58s  |  DATA I/O 688.42kB  |  RESOURCES 1

OPS CENTRAL | WORKFLOW CENTRAL | ADMIN

EXECUTION VIEW

| MR | 1760 |
|---|---|
| 1m 46s | |
| 51.96% | |

| MR | 1761 |
|---|---|
| 57s | |
| 27.87% | |

HIVE QUERY | TABLES

```
insert overwrite table q7_volume_shipping
select
    supp_nation, cust_nation, l_year, sum(volume) as
    l_extendedprice * (1 - l_discount)) as volume
from
    (select
        supp_nation, cust_nation, year(l_shipdate) as:
        l_extendedprice * (1 - l_discount) as volume
    from
        q7_volume_shipping_tmp t join
            (select l_shipdate, l_extendedprice, l_discount
            from supplier s join
    nkey, s_nationkey
                (select l_shipdate, l_extendedprice, l_discount
                from customer c join
    ppkey, c_nationkey
                    (select l_shipdate, l_extendedprice, l
                    from orders o join lineitem l
    _suppkey, o_custkey
                        on
                            o.o_orderkey = l.l_orderkey and l.l
    '1995-01-01'
```

*FIG. 5*

HIVE QUERY | TABLES | COPY QUERY

| TABLE NAME | I/O | RECORDS | TASKS |
|---|---|---|---|
| default.nation | 2.34 KB | 25 | 1 |
| default.orders | 1.62 GB | 15000000 | 5 |
| default.customer | 232.08 MB | 1500000 | 1 |
| default.supplier | 13.43 MB | 100000 | 1 |
| default.lineitem | 7.19 GB | 59986052 | 28 |
| Temp tables | 611.44 MB | 13866159 | 9 |
| default.region | ... | ... | ... |

MR 0065
default.supplier
36s
3.59%

| TABLE NAME | I/O | RECORDS | TASKS |
|---|---|---|---|
| defaults.supplier | 13.43MB | 100000 | 1 |
| -mr-10005 | 699B | 5 | 1 |

MAP OPERATIONS
○—○
○—○

CONDITIONAL

CLOSE

*FIG. 7*

| NAVIGATION | START TIME | DURATION | I/O | RESOURCES | EVENTS |
|---|---|---|---|---|---|
| HIVE | 18Nov 07:03 PST | 17m 26s | 10.24 GB | 5.76 | 2 |
| MR...0064 | 18Nov 07:03 PST | 27s | 2.55 KB | 4.49 | 0 |
| MR...0069 | 18Nov 07:019 PST | 35s | 991B | 5.14 | 0 |
| MR...0070 | 18Nov 07:20 PST | 33s | 868B | 8.62 | 0 |
| MR...0068 | 18Nov 07:17 PST | 2m 9s | 311.43MB | 4.91 | 1 |
| MR...0067 | 18Nov 07:12 PST | 5m 11s | 2.21GB | 5.68 | 1 |
| MR...0066 | 18Nov 07:04 PST | 7m 34s | 7.71GB | 6.8 | 1 |

FIG. 8

| TIMELINE | LOGS | CONFIGURATION | |
|---|---|---|---|
| | | mapred.jobtracker.maxtasks.per.job | -1 |
| | | hive.exec.job.debug.capture.stacktraces | true |
| | | hive.exec.orc.memory.pool | 0.5 |
| | | mapred.line.input.format.linespermap | 1 |
| | | mapred.system.dir | ${hadoop.tmp.dir}/map |
| | | mapred.min.split.size.per.node | 1 |
| | | hive.stats.reliable | false |
| | | dfs.namenode.delegation.token.renew-interval | 86400000 |
| | | hive.metastore.connect.restries | 5 |
| | | mapred.job.complete.cancel.delegation.tokens | true |
| | | hive.auto.progress.timeout | 0 |
| | | hive.hmshandle.retry.interval | 1000 |
| | | detanucleus.storeManagerType | rdbms |

*FIG. 13*

| RECENT WORKFLOWS | | | | | REFRESH LIST |
|---|---|---|---|---|---|
| W | WORKFLOW ETL WORKFLOW<br>⊿ HADOOP ⊛ DEFAULT ⊙ LAST RUN :01 JUNE 22:12 PST<br>⇨ 20440524T173342Z-56176826174945593 | DURATION +1.85%<br>5m 54s<br>AVG 5m 48s | DATA I/O +300.00%<br>14.37GB<br>AVG 14.37GB | RESOURCES +3.06%<br>13.87<br>AVG 13.46 | JOBS 5 RUNS<br>3 SHOW PREV |
| W | WORKFLOW PIG-TESTING<br>⊿ HADOOP ⊛ DEFAULT ⊙ LAST RUN :28 JUL 21:20 PST<br>⇨ 005702-140910052229569-OOZIE-OOZI-W | DURATION +300.00%<br>4m 4s<br>AVG 1m 1s | DATA I/O +300.00%<br>528B<br>AVG 132B | RESOURCES<br>...<br>AVG ... | JOBS 4 RUNS<br>2 SHOW PREV |
| RUNNING | WORKFLOW CEO-REPORT<br>⊿ HADOOP ⊛ DEFAULT ⊙ LAST RUN :18 NOV 07:00 PST<br>⇨ 20140523T173342Z-3521671521284235453 | DURATION +80.24%<br>1h 19m 44s<br>AVG 44m 14s | DATA I/O -44.97%<br>17.42GB<br>AVG 31.66GB | RESOURCES -80.81%<br>2.2<br>AVG 11.46 | JOBS 4 RUNS<br>9 SHOW PREV |

*FIG. 14*

| NAVIGATION | START TIME | DURATION | I/O | RESOURCES | EVENTS |
|---|---|---|---|---|---|
| HIVE | 18NOV 07:00 PST | 3m 21s | 7.19 GB | 4.22 | 1 |
| HIVE | 18NOV 07:03 PST | 17m 26s | 10.24 GB | 4.32 | 2 |
| MR...0064 | 18NOV 07:03 PST | 27s | 2.55KB | 4.49 | 0 |
| MR...0069 | 18NOV 07:19 PST | 35s | 991B | 5.14 | 0 |
| MR...0070 | 18NOV 07:20 PST | 33s | 868B | 5.62 | 0 |
| MR...0068 | 18NOV 07:17 PST | 2m 9s | 311.43MB | 4.91 | 1 |
| MR...0067 | 18NOV 07:12 PST | 5m 11s | 2.21GB | 5.68 | 1 |

LEADERBOARDS

USERS | TABLES | REFRESH

| USER | CLUSTER TIME | #JOBS | #MAP | #RED | I/O |
|---|---|---|---|---|---|
| sandra | 2d 16h 12m 32s | 9 | 83279 | 1068 | 3.41TB |
| mmichael | 1d 23h 20m 39s | 4 | 50078 | 901 | 590.98GB |
| hadoop | 12h 12m 12s | 399 | 2945 | 671 | 34.88GB |
| mtsugawa | 1h 35m 36s | 1 | 1 | 1 | 264KB |
| rajeev | 1h 27m 7s | 2 | 298 | 600 | 65.34gb |
| unravel | 1m 36s | 5 | 5 | 5 | 1.27KB |

| SERVICES | |
|---|---|
| HBASE | GOOD |
| Last checked: 18 Feb 2015 - 10:47:58 PST | |
| HDFS | GOOD |
| Last checked: 18 Feb 2015 - 10:47:32 PST | |
| HUE | GOOD |
| Last checked: 18 Feb 2015 - 10:47:58 PST | |
| KAFSA | GOOD |
| Last checked: 18 Feb 2015 - 10:47:32 PST | |
| METASTORE | GOOD |

*FIG. 21*

| HEALTH | EFFICIENCY |

RESOURCE WASTAGE

| STATUS | DURATION | I/O | RESOURCES | EVENTS | #JOBS |
|---|---|---|---|---|---|
| SUCCESS | 1h 32m 29s | 117.5GB | 45.02 | 1 | 2 |
| SUCCESS | 1h 59m 53s | 1.19TB | 244.63 | 2 | 4 |

LOAD IMBALANCE

| STATUS | DURATION | I/O | RESOURCES | EVENTS | #JOBS |
|---|---|---|---|---|---|
| KILLED | 2d 12h 40m 38s | 2.17TB | 16 | 1 | 1 |
| KILLED | 1d 1h 59m 53s | 594.66GB | 11 | 1 | 1 |

INEFFICIENT JOINS

| STATUS | DURATION | I/O | RESOURCES | EVENTS | #JOBS |
|---|---|---|---|---|---|
| KILLED | 18m 29s | 7.72GB | 34.94 | 2 | 4 |
| KILLED | 30m 7s | 105.29 | 29.23 | 3 | 7 |

INEFFECTIVE DEGREE OF PARALLELISM

| STATUS | DURATION | I/O | RESOURCES | EVENTS | #JOBS |
|---|---|---|---|---|---|
| SUCCESS | 2h 17m 12s | 590.98GB | 77.27 | 1 | 2 |
| KILLED | 20h 46m 9s | 594.64TB | 16 | 1 | 1 |

EXCESSIVE WAIT

| STATUS | DURATION | I/O | RESOURCES | EVENTS | #JOBS |
|---|---|---|---|---|---|
| SUCCESS | 1h 40m 5s | 467.57KB | 1 | 1 | 1 |
| KILLED | 30m 7s | 105.29GB | 29.23 | 3 | 7 |

SMALL FILES

| STATUS | DURATION | I/O | RESOURCES | EVENTS | #JOBS |
|---|---|---|---|---|---|
| SUCCESS | 2h 17m 12s | 590.98GB | 77.27 | 1 | 2 |
| SUCCESS | 1h 59m 53s | 1.19TB | 244.63 | 2 | 4 |

*FIG. 22*

SYSTEM AND METHOD FOR ANALYZING BIG DATA ACTIVITIES

CROSS-REFERENCE TO RELATED APPLICATIONS

This application is a continuation of U.S. application Ser. No. 15/047,554, filed Feb. 18, 2016, which claims priority to U.S. provisional patent application 62/117,902, filed Feb. 18, 2015, entitled "SYSTEM AND METHOD FOR ANALYZING BIG DATA ACTIVITIES," the entire disclosures of which are hereby incorporated by reference.

FIELD

The present system and method relate generally to the field of computers, and particularly to a system and method for analyzing big data activities.

BACKGROUND

Big data systems are very complex. The productivity of application developers and operations staff plummets when they have to constantly track many interdependent factors such as application behavior, resource allocation, data layout, and job scheduling to keep big data applications running. Problems associated with the operation of big data systems becomes hard to identify, diagnose, and fix.

SUMMARY

A system and method for analyzing big data activities are disclosed. According to one embodiment, a system comprises a distributed file system for the entities and applications, wherein the applications include one or more of script applications, structured query language (SQL) applications, Not Only (NO) SQL applications, stream applications, search applications, and in-memory applications. The system further comprises a data processing platform that gathers, analyzes, and stores data relating to entities and applications. The data processing platform includes an application manager having one or more of a MapReduce Manage, a script applications manager, a structured query language (SQL) applications manager, a Not Only (NO) SQL applications manager, a stream applications manager, a search applications manager, and an in-memory applications manager. The application manager identifies if the applications are one or more of slow-running, failed, killed, unpredictable, and malfunctioning.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 3 is an exemplary illustration of an exemplary events panel for an application, according to one embodiment.

FIG. 5 is an exemplary illustration of a user interface for the application manager, according to one embodiment.

FIG. 7 is an exemplary illustration of a user interface for data breakdown, according to one embodiment.

FIG. 8 is an exemplary illustration of a navigation user interface, according to one embodiment.

FIG. 13 is an exemplary illustration of a user interface for providing configuration information, according to one embodiment.

FIG. 14 is an exemplary illustration of a user interface for centralized workflow, according to one embodiment.

FIG. 16 is an exemplary illustration of a user interface for navigation, according to one embodiment.

FIG. 20 is an exemplary illustration of a user interface for a leaderboard, according to one embodiment.

FIG. 21 is an exemplary illustration of a service manager, according to one embodiment.

FIG. 22 is an exemplary illustration of a user interface for a centralized inefficiencies display, according to one embodiment.

Figure 1:
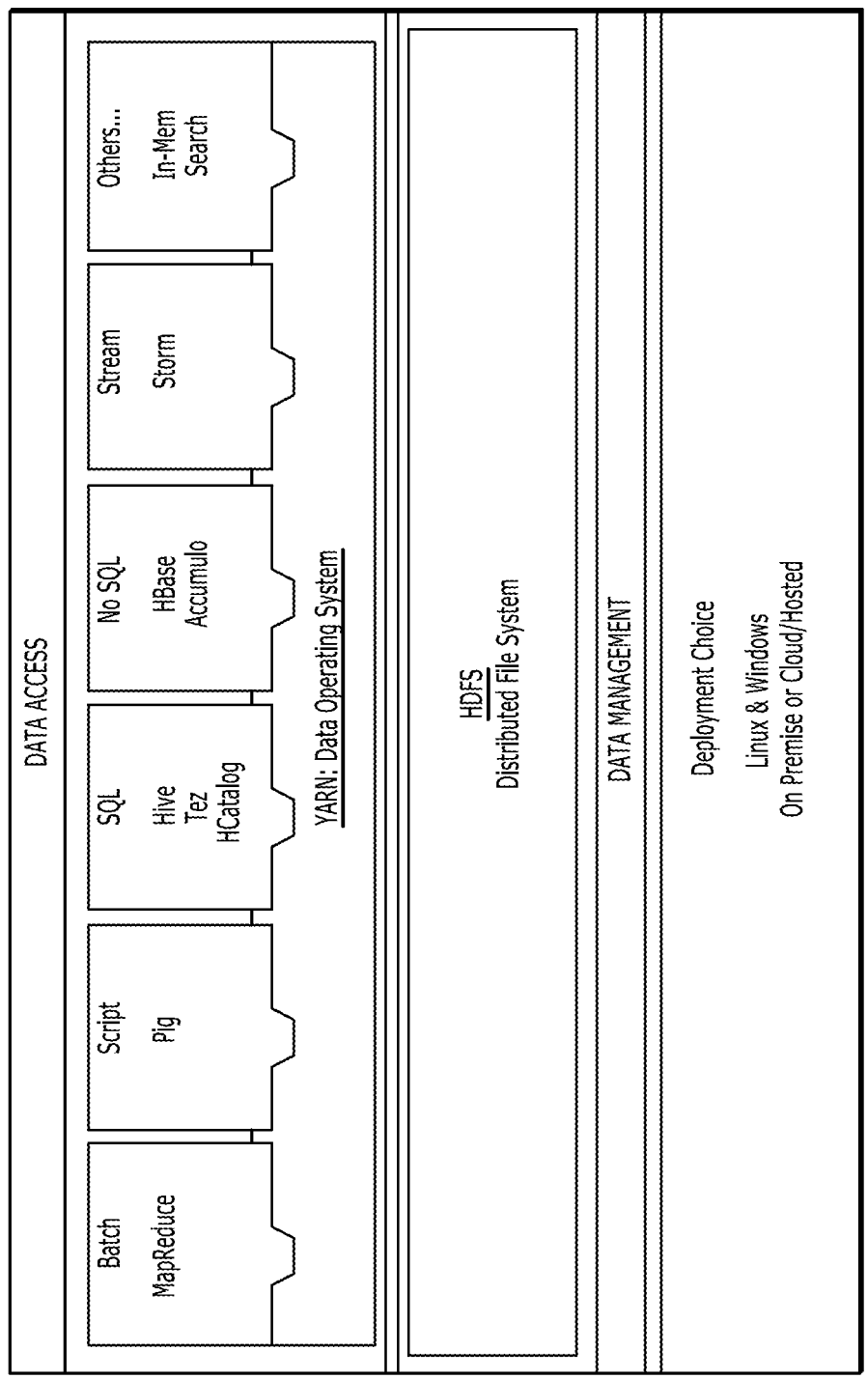
FIG. 1 is an exemplary illustration of applications that the present system and method support, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A system and method for analyzing big data activities are disclosed. According to one embodiment, a system comprises a distributed file system for the entities and applications, wherein the applications include one or more of script applications, structured query language (SQL) applications, Not Only (NO) SQL applications, stream applications, search applications, and in-memory applications. The system further comprises a data processing platform that gathers, analyzes, and stores data relating to entities and applications. The data processing platform includes an application manager having one or more of a MapReduce Manage, a script applications manager, a structured query language (SQL) applications manager, a Not Only (NO) SQL applications manager, a stream applications manager, a search applications manager, and an in-memory applications manager. The application manager identifies if the applications are one or more of slow-running, failed, killed, unpredictable, and malfunctioning.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

The present system and method creates a holistic view of big data activities. An operator can quickly understand what is working, get insights into potential issues proactively, and easily dig deep into what is not working or what is not working properly in an integrated and intelligent platform. The present system and method also increases team and system productivity, empowers developers to become self-servicing, and transforms operations from reactive to proactive.

Whether it is an ad-hoc SQL inquiry in Hive or a repeatedly-run workflow in Spark running either on the cloud or an on-premises cluster, extensive knowledge of the inner workings of big data systems is required to obtain the desired application performance and cluster efficiency. The present system and method learns about big data usage, identifies errors, and recommends solutions. Thereby, companies can focus on their core business issues instead of spending time and resources at optimizing big data applications and their systems.

The present system and method also allows companies to take control of the entire big data operation from applications to infrastructure and allow them to focus on making big data work for their business. The present system and method analyzes big data activities from different dimensions to continuously spot and eliminate problems that lower return-on-investment, impede data democracy, and prevent the company from innovating with big data.

The present disclosure describes an intelligence platform that helps simplify, optimize and control big data activities. The present intelligence platform works for big data application engines and can be used for any type of deployment: bare-metal, cloud, or hybrid. The present system and method provides big data analytics to allow companies and service providers to increase performance of big data systems, for example, increasing a Hadoop workload by multiple times, while saving time in finding optimal settings. Typical Hadoop dashboards provide information about the system performance but an expert is required to identify system errors or failures and fix them. The present system makes it easy to discover and solve problems by making operations proactive and users self-servicing.

FIG. 1 shows an exemplary big data system, according to one embodiment. The top part of FIG. 1 shows the breadth of applications that the present system and method can support. A program is submitted on a big data system to produce desired results. These applications come in a wide variety such as MapReduce, Pig, Hive, Tez, HCatalog, HBase, Accumulo, Storm, In-Mem Search, etc. Applications can be submitted directly or be submitted through higher-level software such as Tabaleu. It is apparent that the present system and method can cover other application types submitted both directly and indirectly.

Figure 2:
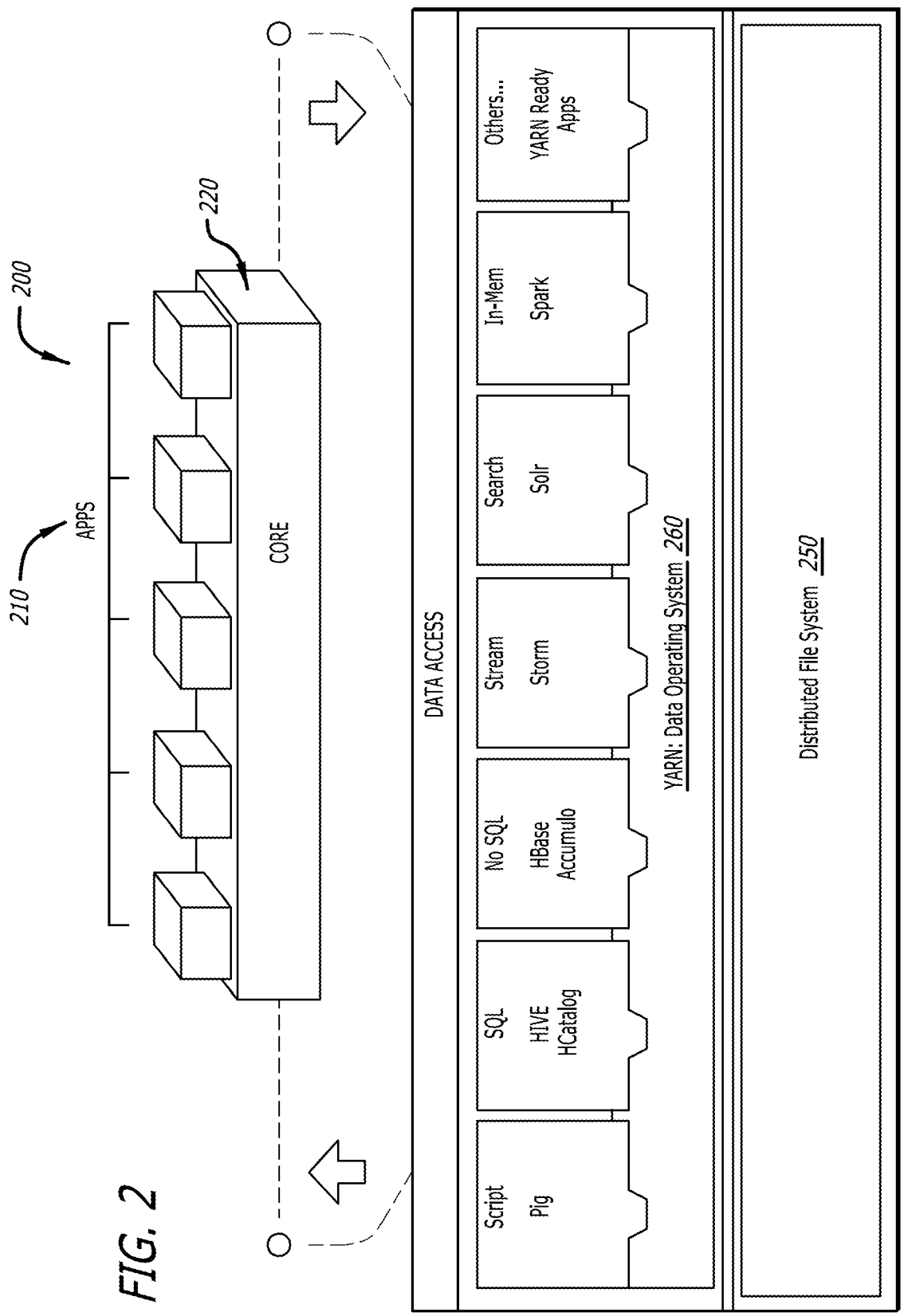
FIG. 2 is an exemplary illustration of the system architecture of the present system, according to one embodiment.

FIG. 2 shows the system architecture of the present system, according to one embodiment. The present intelligence platform 200 consists of a core 210 and a suite of applications 220. The core 210 is a data processing platform that constantly gathers, analyzes, and stores data about entities and applications of the distributed file system 250 (e.g., Hadoop distributed file system). The distributed file system 250 runs a data operating system 260 (e.g., YARN) and various applications therefrom such as Script applications (e.g., Pig), structured query language (SQL) applications (e.g., Hive, HCatalog), Not Only (NO) SQL applications (e.g., HBase, Accumulo), stream applications (e.g., Storm), search applications (e.g., Solr), In-memory applications (e.g., Spark), and other applications (e.g., YARN-ready applications). The results of the analysis may be fed back to the distributed file system 250 to increase the performance of the distributed file system 250. The present system processes this data to power the applications.

The present intelligence platform engine applies several processes to the data gathered in the core to power events, alerts, root-cause analysis, recommendations and solutions. Table 1 shows exemplary features of the present intelligence platform.

TABLE 1

| Applications | Features |
|---|---|
| 1) Application Manager | Includes DAG, KPIs and app details. |
| a) MapReduce Manager | Enables live, automatic diagnosis and resolution of: |
| b) Pig Manager | |
| c) Hive Manager | Slow-running applications |
| d) Spark Manager | Failed or killed applications |
| e) Custom Application Manager | Unpredictable application behavior |
| | Applications producing incorrect results |
| 2) Workflow Manager | Includes DAG, KPIs and workflow details. |
| a) Oozie Workflow Manager | Correlates workflows to business processes |
| b) Custom Workflow Manager | Enables monitoring and meeting workflow Service Level Agreements (SLAs) |
| | Performs comparison, trending, and reporting of data access, resource usage, configuration, etc., among various runs of a workflow over time |
| 3) Core Apps | Automatically detects, diagnoses, and recommends solutions for inefficiencies and errors in applications and resources |
| a) Deep Events | |
| b) Live Alerts | |
| c) Info Tags | Provides custom alerts to track all activities, inefficiencies, and errors in the cluster |
| d) Entity Search | Enables custom tagging of applications, resources, tables, users, etc., for reporting, discoverability, and comparison. |
| | Enables powerful and easy search over applications, resources, tables, users, etc. |
| 4) Ops Central | Enables automatic diagnosis and resolution of inefficient cluster usage |
| a) Application Central | |
| b) Resource Central | Proactively alerts on inefficient or inappropriate use of data and resources by applications |
| c) Data Central | |
| d) User Central | |
| e) Service Central | Chargeback/Showback - Splits usage and cost of the cluster and resources by user group, application type, etc. |
| f) Inefficiencies Central | |
| g) Reporting | |
| | Automatically creates leaderboards to identify the most resource-consuming and resource-wasting applications, users, tables, and queues |
| | Correlates changes in application performance with changes in data size, resource contention, and performance degradation of Hadoop services |
| 5) Data Manager | Identifies hot and cold tables |
| a) Top-N lists | Summarizes data usage and access patterns across files, tables, queries, columns, and joins |
| b) Pattern Analyzer | |
| c) Auditor | Recommends the best data partitioning and storage layout based on usage |
| | Audits data access by applications and users |
| 6) Planner | Identify cheapest or fastest infrastructure for workload |
| | Which datasets to move |
| | Which Application Engine to choose |
| | How to allocate resources |
| | When and how to scale-up and scale-down |

The present intelligence platform comes with built-in core applications that power smart features and allow for the productive and efficient management of big data systems. Examples of core applications include, but are not limited to, Deep Events, Live Alerts, Info Tags, and Entity Search.

Deep Events—powered by machine-learning algorithms. The Deep Events application takes a role of a Hadoop expert to identify errors and inefficiencies in the system automatically. The Deep Events application also provides automatic root-cause analysis and solutions for application and system-level problems. The Deep Events application is tightly integrated with other applications such as the Application Manager, Workflow Manager, Ops Central, and Data Manager. FIG. 3 shows a screen shot of an exemplary events panel for an application, according to one embodiment. The Events Panel may list other events associated with the application to provide analysis and solutions for the application.

Figure 4:
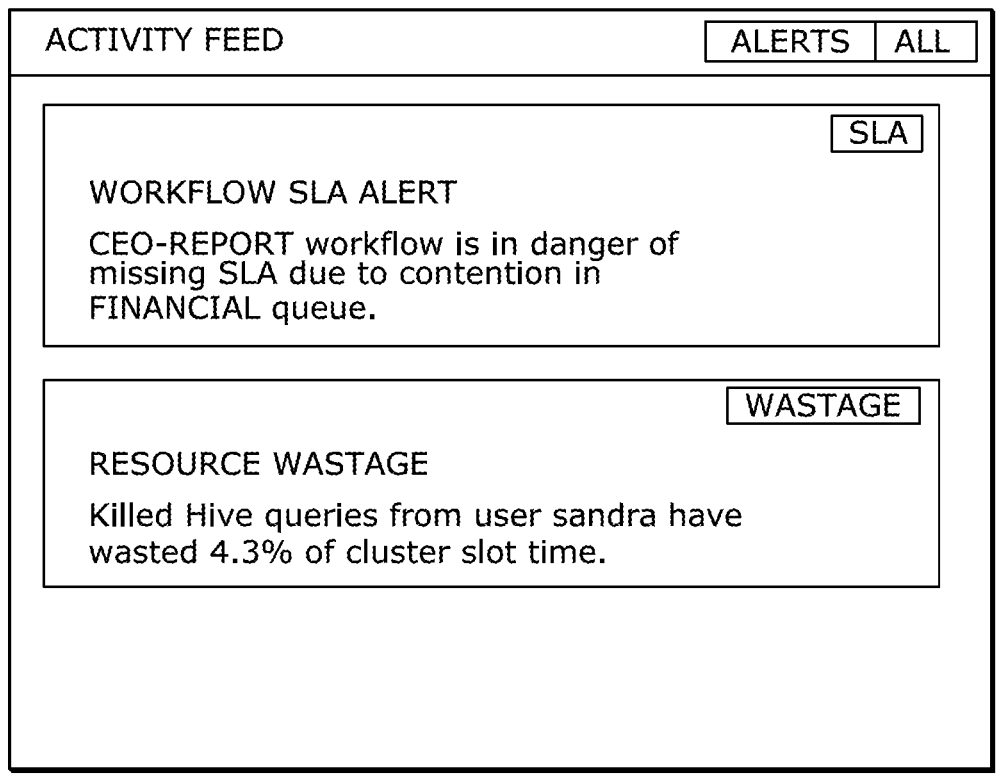
FIG. 4 is an exemplary illustration of a live workflow SLA alert and live resource wastage alert, according to one embodiment.

Live Alerts—users can set custom alerts on applications, workflows, users, tables, queues, etc., to proactively find and eliminate errors and inefficiencies. Live Alerts are Twitter-like streams that bring users' attention to the most important tasks. FIG. 4 shows a screen shot of an exemplary Live Alert, according to one embodiment. The Live Alerts shows workflow Service Level Agreement (SLA) alert and resource wastage.

Info Tags—the present intelligence platform provides tagging as an easy mechanism to improve grouping and discoverability. Teams can tag applications, workflows, tables, users, and any other entity to be able to search, group, and report over.

Entity Search—the integrated search engine of the present intelligence platform intelligently indexes and associates all cluster activity with applications, workflows, tables, users, queues, machines, and other entities. With Entity Search, developers and operations staff can search for any entity and get all relevant information for it instantly in a single screen. For example, searching for a user presents all information about that user including applications run, resources used, inefficiencies caused, etc.

The Application Manager provides a comprehensive view into the behavior of MapReduce, Pig, Hive, Spark, and custom applications. The Application Manager is used by Hadoop application owners (e.g., developers, business analysts, data scientists) to quickly understand and resolve inefficiencies, bottlenecks, and reasons for application failure.

In addition to applications being submitted directly through Hive, Pig, Spark, etc. the application manager also captures applications that are not being submitted directly but through a third party program. For example, a user who wants to check out graphs using Tableau software may submit Hive applications under the cover. The application manager tells the user when his/her graph does not show up or takes a long time to load. FIG. 5 shows a screen shot of the application manager, according to one embodiment. The application manager shows the events and the status (e.g., success, killed), a duration, data I/O, and the number of resources, the execution view.

Figure 6:
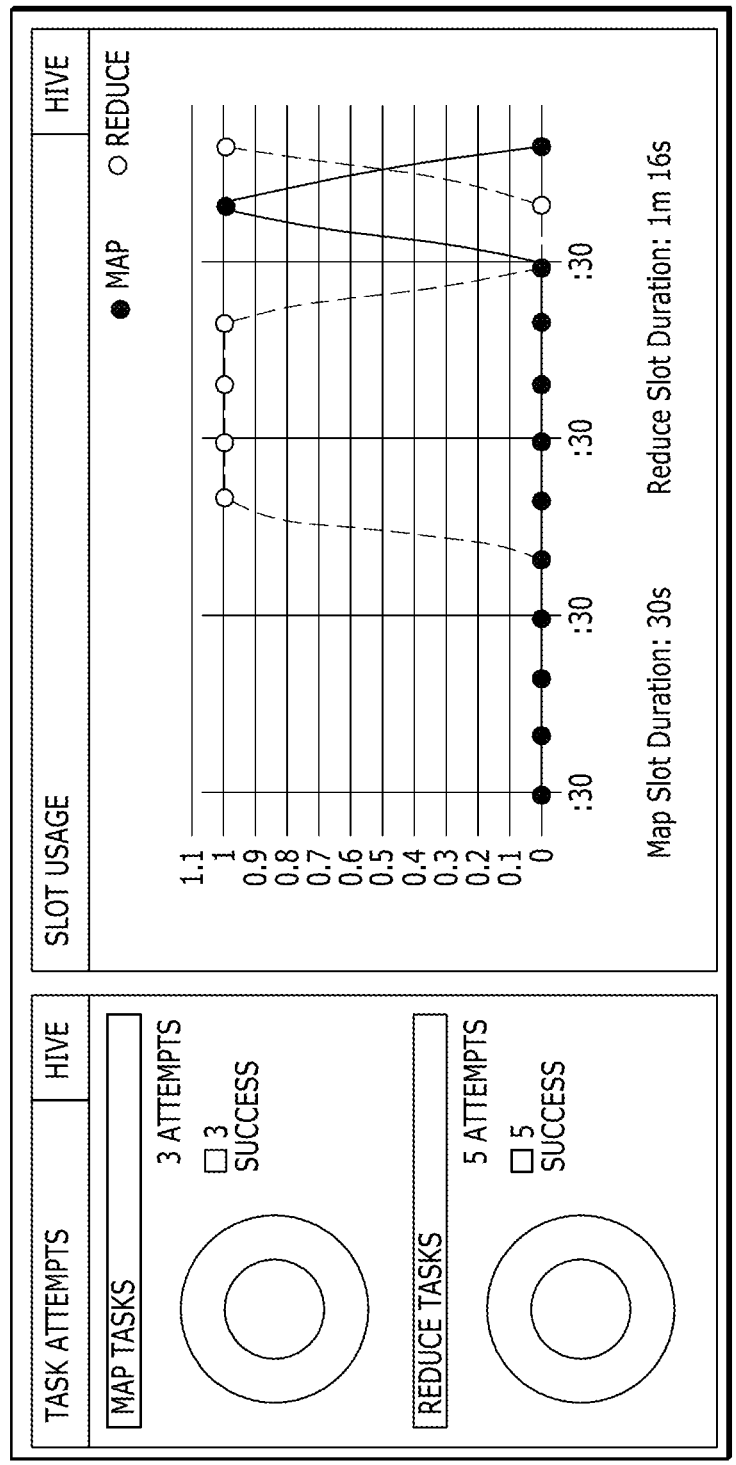
FIG. 6 is an exemplary illustration of a user interface for resource usage breakdown, according to one embodiment.
Figure 9:
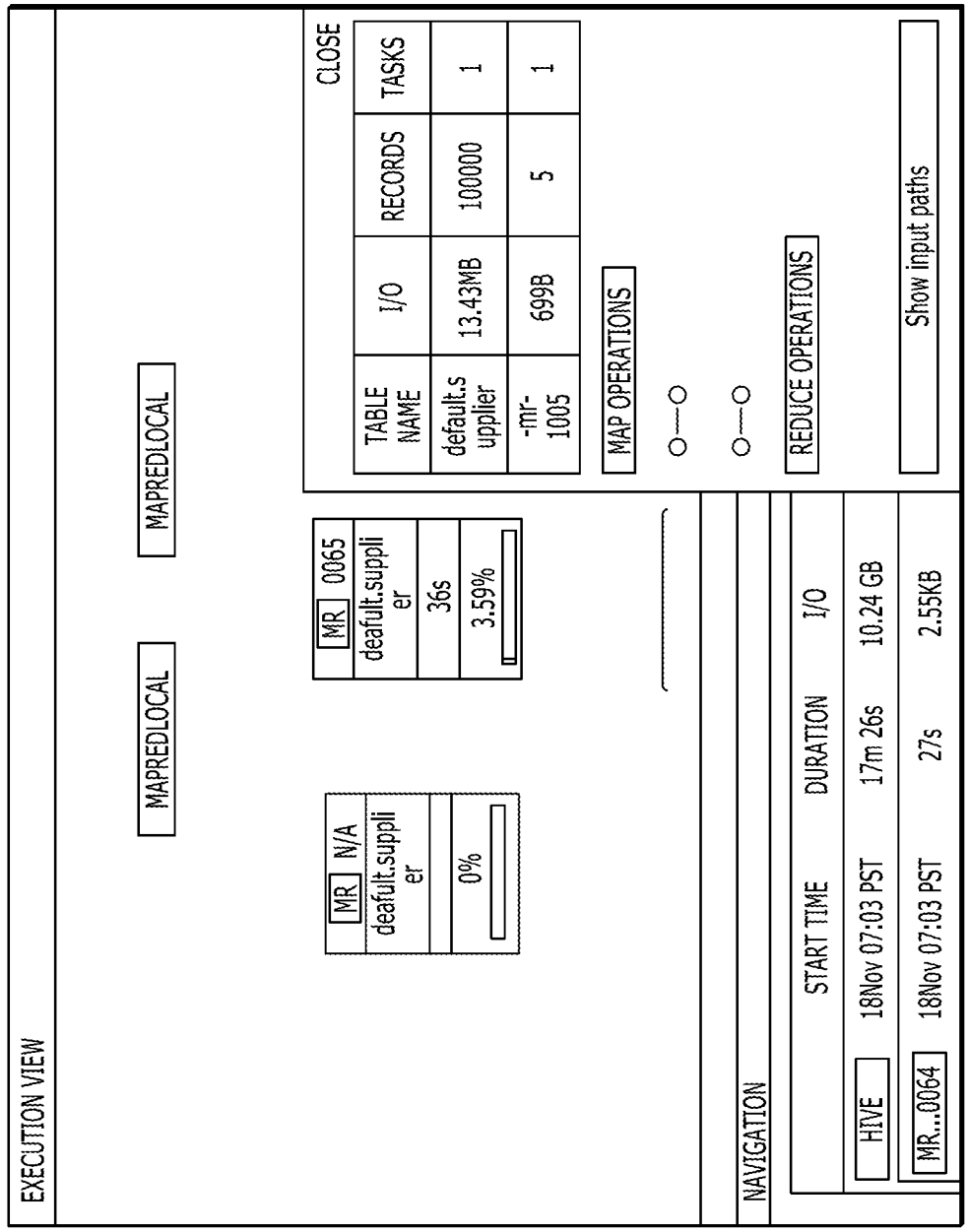
FIG. 9 is an exemplary illustration of a user interface for providing an execution view, according to one embodiment.
Figure 10:
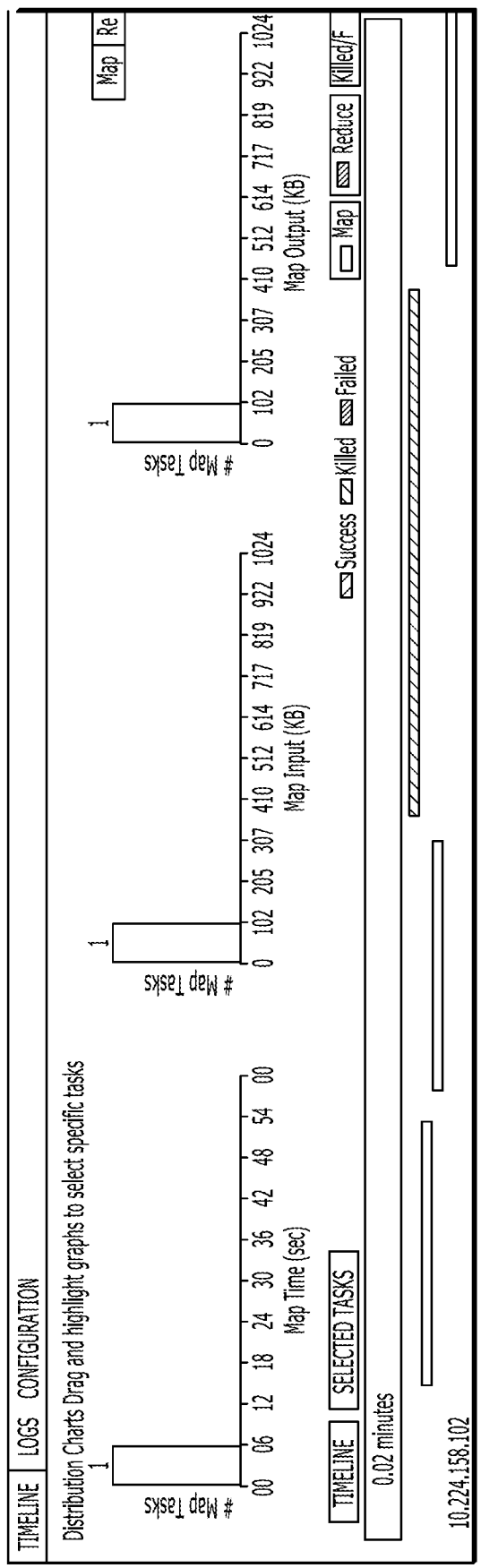
FIG. 10 is an exemplary illustration of a user interface for a MapReduce timeline, according to one embodiment.
Figure 11:
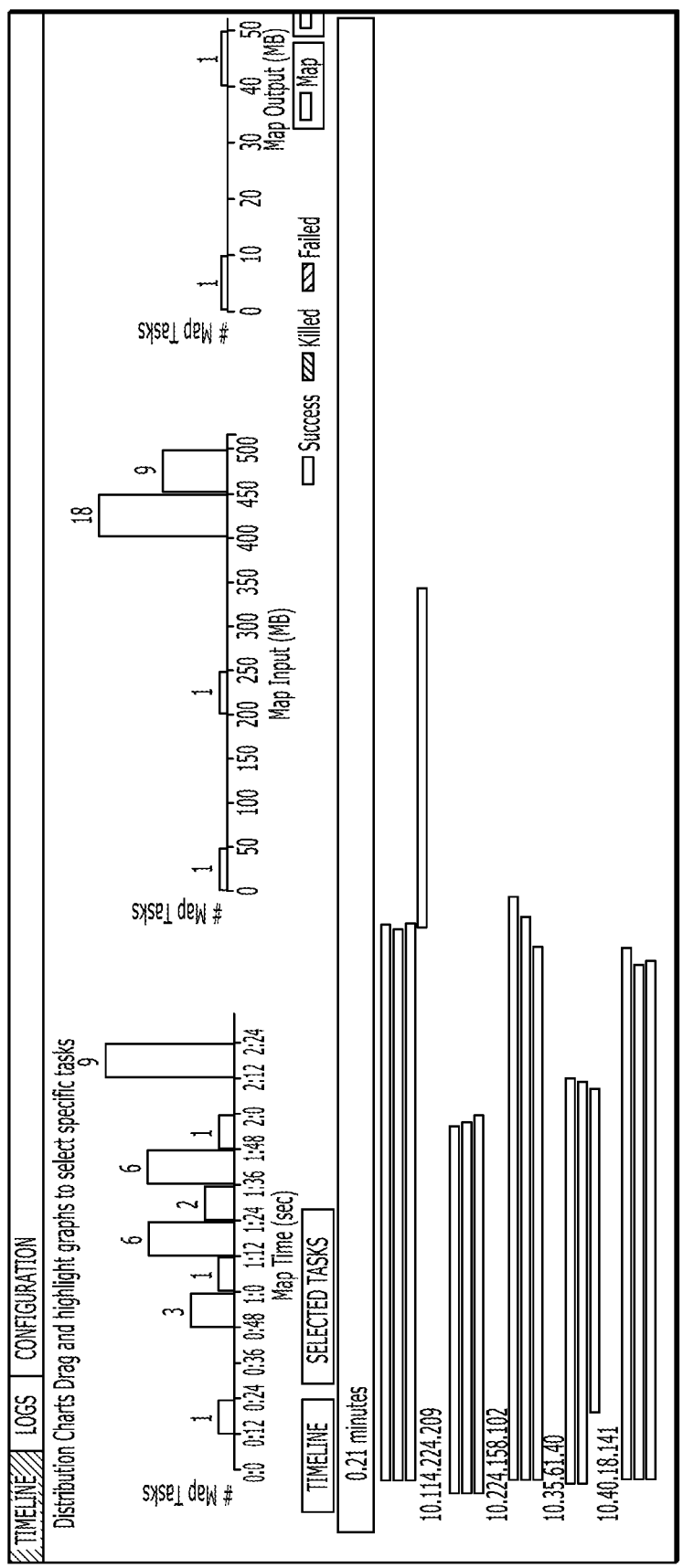
FIG. 11 is an exemplary illustration of a user interface for a skew view, according to one embodiment.
Figure 12:
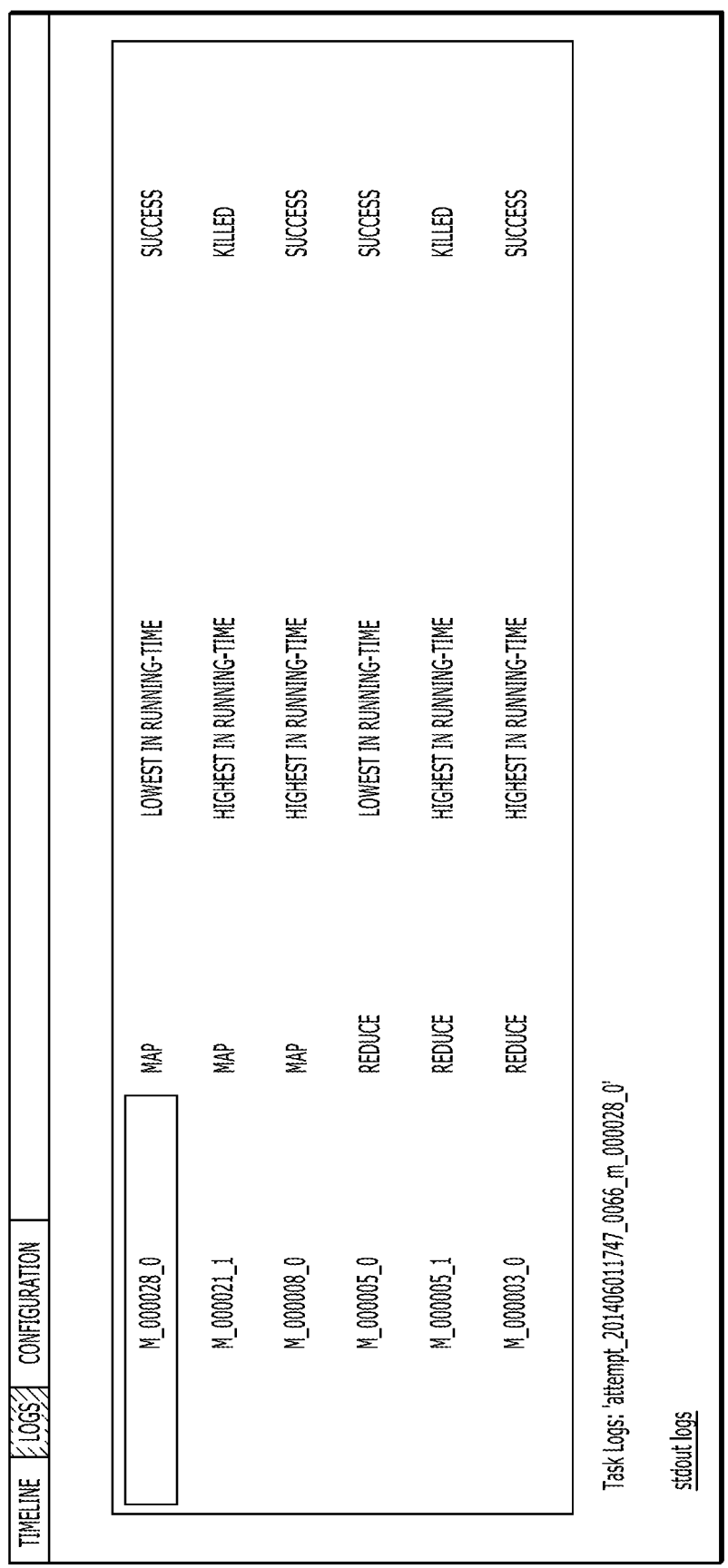
FIG. 12 is an exemplary illustration of a user interface for providing log information, according to one embodiment.

The Application Manager includes the following features:
1) Deep Events—Deep Events automatically identify inefficiencies and errors. Deep Events also provide automated remedies as well as guidance on how to resolve the identified application problems.
2) Resource usage breakdown—Resource usage breakdown understands how and what resources are used by an application. Resource usage breakdown shows slot usage and map/reduce attempt successes and failures in an intuitive visual. FIG. 6 shows a screen shot of an exemplary resource usage breakdown, according to one embodiment. The number of attempts for map tasks and reduce tasks are shown in a slot usage graph including a slot duration.
3) Data breakdown—Data breakdown understands how and how much data is read and written by an application and by every stage in the application. FIG. 7 shows a screen shot of an exemplary data breakdown, according to one embodiment. The data associated with a MapReduce are shown in a tabular format listing the table names, the amount of I/O data, the number of records, and the number of tasks.
4) Duration breakdown—Understand how time was spent in various stages and phases of the application execution.
5) Navigation—Navigation provides an easy navigation of applications and their components with drill-down capabilities. FIG. 8 shows a screen shot of an exemplary navigation, according to one embodiment.
6) Execution view—Execution view provides a graphical view of application execution. Execution view helps identify bottlenecks and get detailed information about each stage of the application. FIG. 9 shows a screen shot of an exemplary execution view, according to one embodiment.
7) MapReduce timeline—MapReduce timeline provides a detailed view of each map/reduce task along a timeline on the machines that an application is executed. MapReduce timeline includes filters to display map, reduce, failed, killed, and successful tasks. MapReduce timeline helps to understand map, reduces execution phases, and narrow down problematic tasks and machines. FIG. 10 shows a screen shot of an exemplary MapReduce timeline, according to one embodiment.
8) Skew view—Skew view shows distribution of time and size of map and reduce tasks to identify a skew. Skew view also acts as a filter to narrow down skewed tasks on the MapReduce timeline. FIG. 11 shows a screen shot of an exemplary skew view, according to one embodiment.
9) Log information—Log information selects an application, a job, and task-level logs to provide the user with complete information about an application. FIG. 12 shows a screen shot of an exemplary log information, according to one embodiment.
10) Configuration information—Configuration information provides a complete list of all configuration settings affecting an application. FIG. 13 shows a screen shot of an exemplary configuration information, according to one embodiment.

Figure 15:
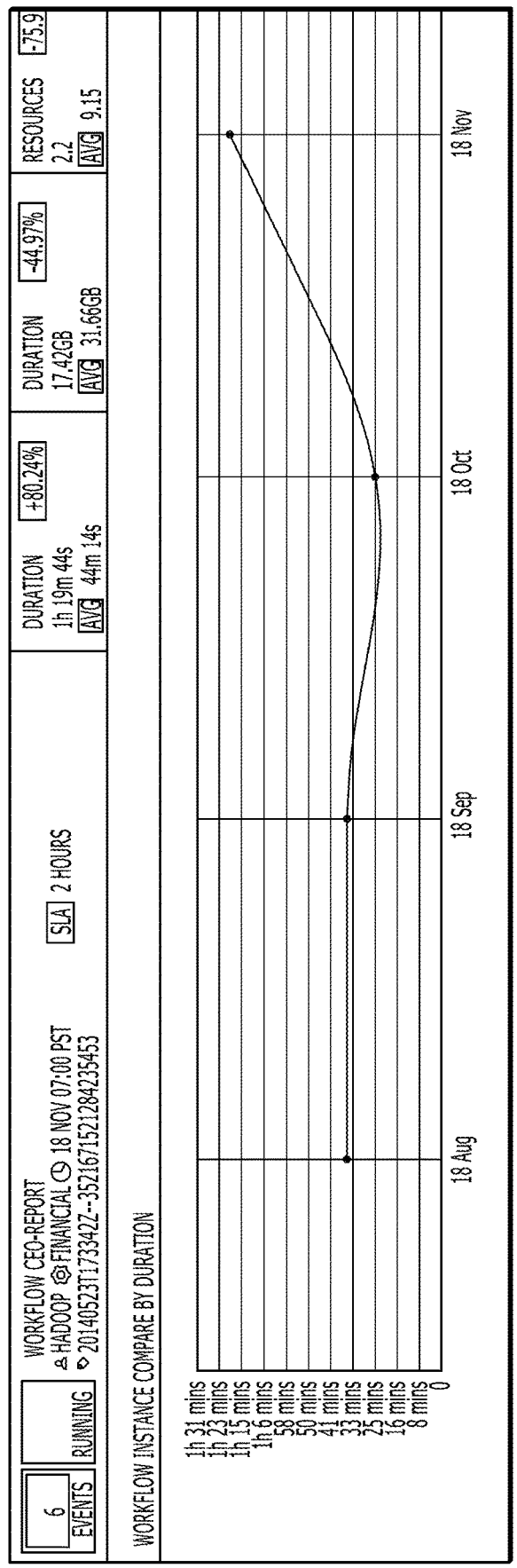
FIG. 15 is an exemplary illustration of a user interface for an instance compare, according to one embodiment.
Figure 17:
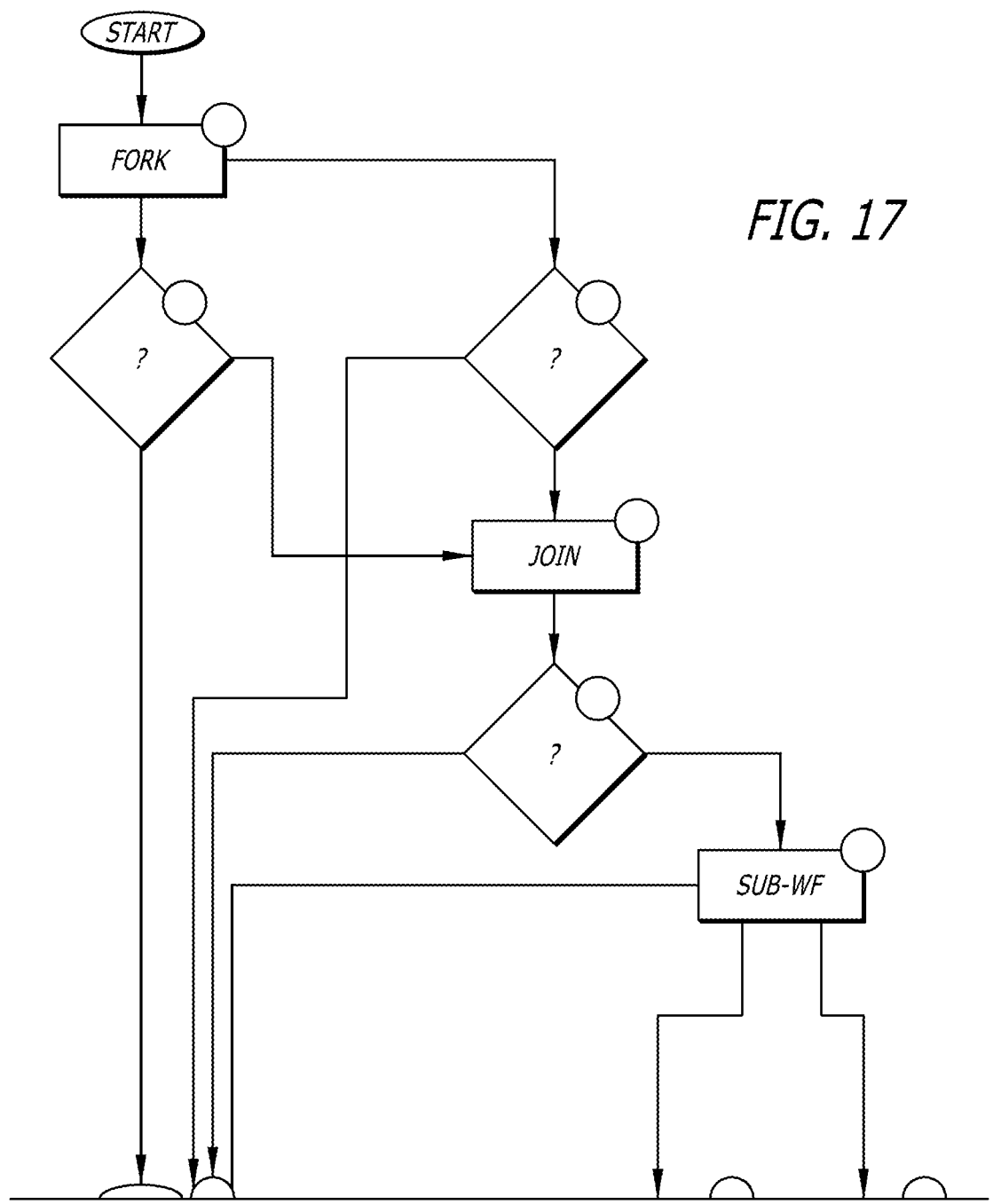
FIG. 17 is an exemplary illustration of a user interface for providing an execution view, according to one embodiment.

The Workflow Manager is designed to integrate with popular workflow engines such as Oozie and cron or custom workflow engines. The Workflow Manager provides an intuitive view to understand workflows and its components in a comprehensive manner. The Workflow Manager is used by workflow (or pipeline) owners to identify and eliminate anomalies, inefficiencies, and bottlenecks in workflow instances, and to guarantee SLAs. The Workflow Manager includes the following features:
1) Workflow Central—Workflow Central provides a single view of defined or 'tagged' workflows in the system. Workflow Central also provides status of how each workflow is performing against its SLA. FIG. 14 shows a screen shot of an exemplary workflow central, according to one embodiment.
2) Workflow Detail Page—Workflow Detail Page provides a view into each workflow to provide users a detailed understanding of the workflow execution. Workflow Detail Page includes:
a. Deep Events—Deep Events automatically identify inefficiencies and errors. Deep Events also provide automated remedy as well as guidance on how to resolve the identified problems for workflows. In one embodiment, Deep Events are the same as in application management.
b. Instance Compare—Instance Compare provides an intuitive comparison graph showing duration, resources used, data processed, and number of applications across various instances of the workflow. Instance Compare is particularly useful to identify anomalies and trends. FIG. 15 shows a screen shot of an exemplary instance compare, according to one embodiment.
c. Navigation—Navigation provides an easy navigation of the workflow and its components with drill-down capabilities. FIG. 16 shows a screen shot of an exemplary navigation, according to one embodiment.
d. Execution view—Execution view provides a graphical view of workflow execution. Execution view helps to identify bottlenecks and get detailed information about each stage of the workflow. FIG. 17 shows a screen shot of an exemplary execution view, according to one embodiment.
e. Resource usage breakdown—Resource usage breakdown understands how and what resources were used by the workflow. Resource usage breakdown also shows slot usage, number of map/reduce task successes and failures in an intuitive visual. In one embodiment, Resource usage breakdown is the same as application manager.
f. Data breakdown—Data breakdown understands how and how much data is read and written by the workflow. In one embodiment, the Data breakdown is the same as application manager.

g. Duration breakdown—Duration breakdown understands how time is spent in various stages and phases of the workflow execution.

Ops Central is an extensible application that provides cluster-level information for diagnosing inefficient usage. Ops Central is used by Hadoop administrators and operations engineers to ensure optimal resource usage. Ops Central includes the following features:

1) Deep Events and Live Alerts—Deep Events and Live Alerts automatically detect inefficiencies with applications, tables, users, and resources and provide alerts to bring attention to missing SLAs, applications wasting resources, and more. FIG. 4 shows a screen shot of workflow SLA alert and resource wastage alerts.

Figure 18:
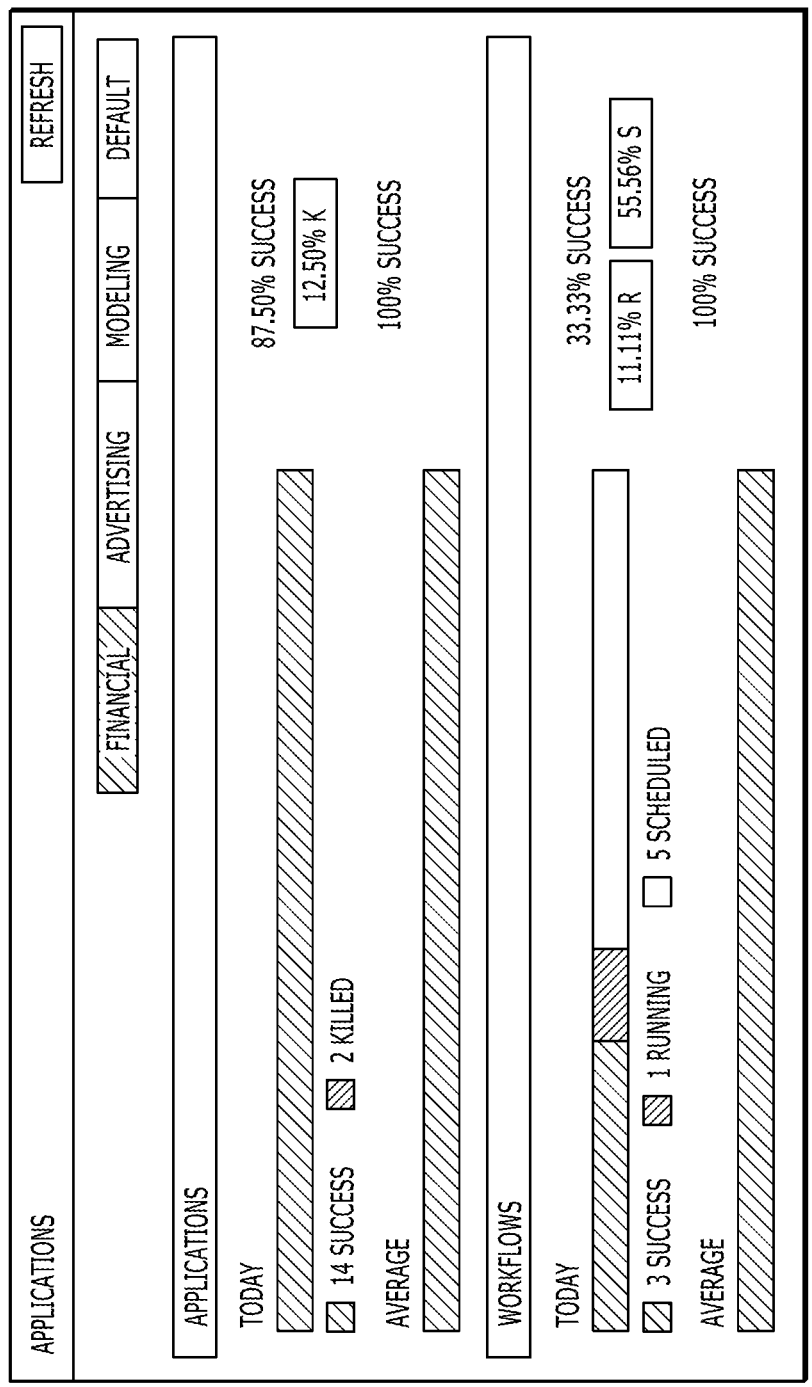
FIG. 18 is an exemplary illustration of a user interface for providing a centralized applications view, according to one embodiment.

2) Application Central—Application Central shows applications that are running, complete, killed, or failed along with their KPIs across several clusters on one screen. Application Central helps to easily understand the workload at any point in time. Application Central allows for grouping applications by type, queues, and business units for easy reporting. Application Central provides the capability to dig into any of these applications to understand more about the application. Application Central is useful when debugging or tuning a particular application of interest. Application Central also allows operations engineers to prioritize jobs, kill rogue jobs and eliminate problems before they become a nuisance on the cluster. FIG. 18 shows a screen shot of an exemplary applications central, according to one embodiment. For applications and workflows running today. The number of successes and killed tasks and the percentage of success rates are shown on the Application Central. According to one embodiment, applications may be grouped by the different operations of a company, for example, financial, advertising, modeling, and default.

Figure 19:
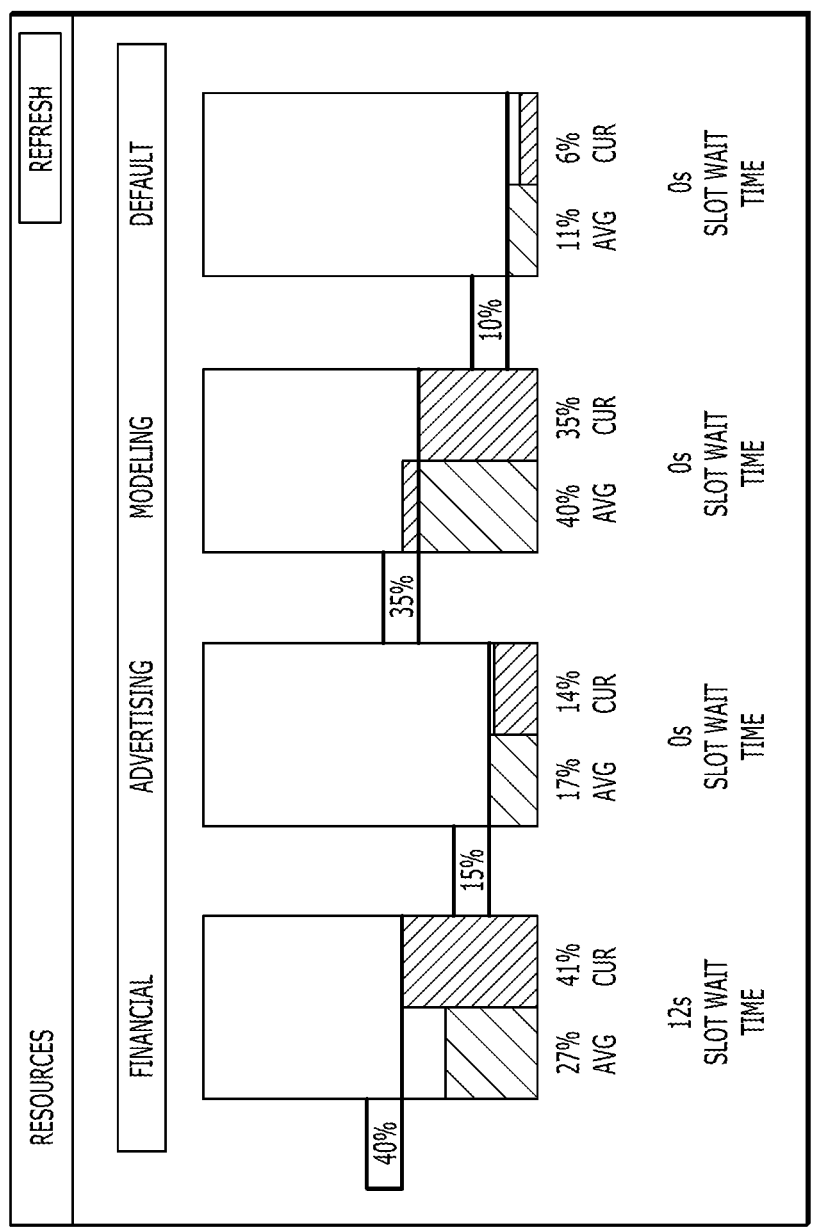
FIG. 19 is an exemplary illustration of a user interface for a resource manager, according to one embodiment.

3) Resource Manager—Resource Manager shows how queues in the system are being used at any point in time. Resource Manager helps to compare current utilization against average and configured utilization levels to understand which queues are over and under-utilized. Resource Manager helps system administrators with resource allocation and capacity planning. FIG. 19 shows a screen shot of an exemplary resource manager, according to one embodiment.

4) Leaderboard—Leaderboard helps to analyze how the system is used. Leaderboard can break down cluster usage by users, data, resources, and queues for workload analysis. Besides showing who is using the system the most, Leaderboard is useful when trying to determine how to partition data, how to allocate resources, and tying system processes to business units. FIG. 20 shows a screen shot of an exemplary leaderboard, according to one embodiment.

5) Service Manager—Service Manager provides a customizable view to understand the status of various services running on the big data platform. Examples of services include, but are not limited to, Pig, Meta-store, and Hue. FIG. 21 shows a screen shot of an exemplary service manager, according to one embodiment.

6) Inefficiencies Central—Inefficiencies Central provides an automatically curated list of applications that have caused inefficiencies in the system. Inefficiencies such as resource wastage, inefficient join, etc. are captured by Inefficiencies Central. FIG. 22 shows a screen shot of an exemplary inefficiencies central, according to one embodiment.

Figure 23:
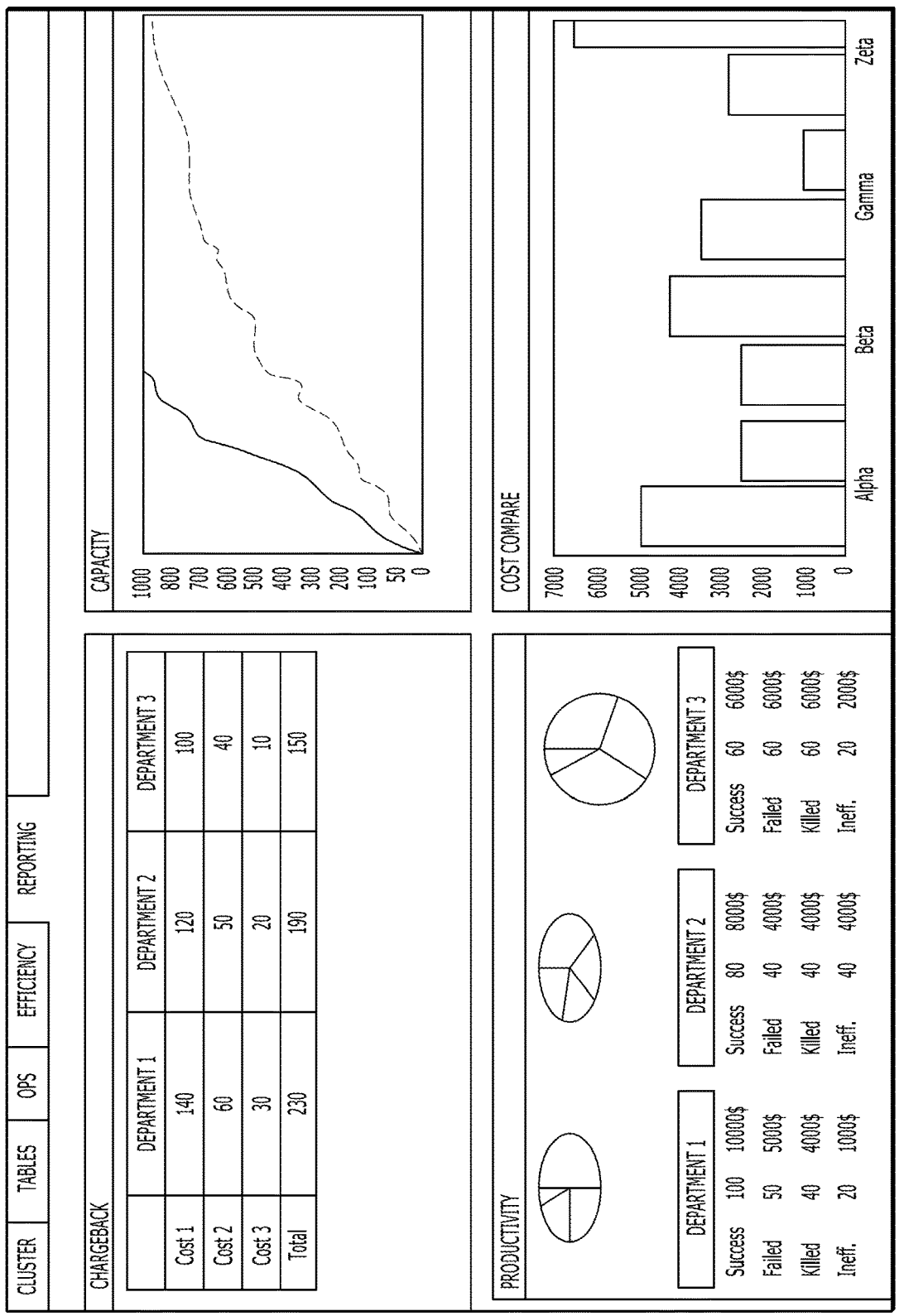
FIG. 23 is an exemplary illustration of a user interface for a reporting display, according to one embodiment.

7) Reporting—Reporting includes chargeback/showback reports to understand how each user/department is utilizing the cluster, their inefficiencies and wastage. Reporting also includes dollar amounts for each of the above. Reporting also includes cluster utilization forecasting report that helps in planning upgrades. FIG. 23 shows a screen shot of an exemplary reporting, according to one embodiment.

Data Manager is designed to provide data architects a comprehensive analysis of data access and usage.

1) Top-N lists provides customizable top-N lists to show which tables, columns, joins, and queries are used the most in the system. Top-N lists also allows users to better partition and layout their data.

2) Pattern analyzer identifies the most important tables and columns in workloads to help design the right storage strategy.

3) Auditor reports data usage and access by applications and users.

Planner helps developers, operations and business leaders to plan their activities to achieve efficiency and productivity. Planner identifies the cheapest or fastest infrastructure for a workload. The present intelligence platform can take any workload (an application or group of applications) profile it, and simulate this workload on any type of server. The result of the simulation is a graph that compares time and cost across the various server types.

Which datasets to move: the present intelligence platform maintains a history of every time a data set or table was touched by an application. This information can be used by companies to help them decide what data to move. For example, if they only wanted recently accessed data to move, they could see the summary of all such tables very easily in the present intelligence platform.

Which Application Engine to choose: similar to which datasets to move, the present intelligence platform can also help to choose an application engine that can work best for a particular workload by profiling that workload and simulating execution across various engine types.

How to allocate resources: Allocating resources within an organization is a challenging task. To find the best allocation one needs to understand how each department/user group is using the infrastructure. Since the present intelligence platform has information about every application that ran, the present intelligence platform can tell companies which department is using what percentage of resources. This helps the companies to allocate resources in an intelligent way rather than simply guessing or splitting down the middle.

When and how to scale-up and scale-down—the present intelligence platform can forecast future usage based on current usage. Therefore, the present intelligence platform can warn the operator ahead of time when running out of capacity. Because the present intelligence platform can also find inefficiencies, the present intelligence platform can also tell what percentage of the resources is used efficiently versus what is wasted. This can help companies plan whether they should scale up or down accordingly.

While particular embodiments have been illustrated and described, it would be obvious to those skilled in the art that various other changes and modifications can be made without departing from the scope of the invention. It is therefore intended to cover in the appended claims all such changes and modifications that are within the use.

We claim:

1. A method, comprising:
identifying using an application manager, resources used by an application for big data running on a cluster and providing MapReduce attempt success and failure totals for a workload;
identifying using a workflow manager, problems with the application by providing a status of how each workflow is performing against a service level agreement;
providing root-cause analysis and solutions for application problems and system-level problems;
providing alerts on the application, each workflow, users, tables, and queues;
tagging the application, each workflow, the tables, the users, and entities;
associating cluster activity with the application, each workflow, the tables, the users, the queues, machines, and the entities; and
simulating execution of the workload to identify a cheapest and a fastest infrastructure for the workload.

2. The method of claim 1, further comprising providing table names, amount of data, a number of records, and a number of tasks.

3. The method of claim 1, further comprising providing a MapReduce timeline, filters to display map, reduce, failed, killed, and successful tasks.

4. The method of claim 1, further comprising providing a skew view that shows a distribution of time and size of map and reduce tasks to identify a skew.

5. The method of claim 1, further comprising providing a view into each workflow to provide a comparison graph showing duration, resources used, data processed, and number of applications across various instances of each workflow.

6. The method of claim 1, further comprising providing a duration breakdown showing how time is spent in stages and phases of each workflow.

7. The method of claim 1, further comprising:
displaying how queues are being used at any point in time; and
determining which queues are over-utilized and under-utilized.

8. The method of claim 1, further comprising determining cluster usage by users, data, resources, and queues.

9. The method of claim 1, further comprising providing a status of services running on a big data platform.

10. The method of claim 1, further comprising providing a list of applications that have caused inefficiencies such as resource wastage and inefficient join.

11. The method of claim 1, further comprising generating a top-N list to show which tables, columns, joins, and queries are used the most.

12. The method of claim 1, further comprising identifying tables and columns in the workload.

13. The method of claim 1, wherein the application is one of a script application, a structured query language (SQL) application, a Not Only (NO) SQL application, a stream application, a search application, and an in-memory application.

14. The method of claim 1, further comprising determining if the application is one or more of slow-running, failed, killed, unpredictable, and malfunctioning.

15. A non-transitory computer readable medium having stored thereon computer-readable instructions, and a processor coupled to the non-transitory computer readable medium, wherein the processor executes the instructions to:
identify using an application manager, resources used by an application for big data running on a cluster and providing MapReduce attempt success and failure totals for a workload;
identify using a workflow manager, problems with the application by providing a status of how each workflow is performing against a service level agreement;
provide root-cause analysis and solutions for application problems and system-level problems;
provide alerts on the application, each workflow, users, tables, and queues;
tag the application, each workflow, the tables, the users, and entities;
associate cluster activity with the application, each workflow, the tables, the users, the queues, machines, and the entities; and
simulate execution of the workload to identify a cheapest and a fastest infrastructure for the workload.

16. The computer readable medium of claim 15, wherein the processor executes the instructions to provide table names, amount of data, a number of records, and a number of tasks.

17. The computer readable medium of claim 15, wherein the processor executes the instructions to provide a MapReduce timeline, filters to display map, reduce, failed, killed, and successful tasks.

18. The computer readable medium of claim 15, wherein the processor executes the instructions to provide a skew view that shows a distribution of time and size of map and reduce tasks to identify a skew.

19. The computer readable medium of claim 15, wherein the processor executes the instructions to provide a view into each workflow to provide a comparison graph showing duration, resources used, data processed, and number of applications across various instances of each workflow.

20. The computer readable medium of claim 15, wherein the processor executes the instructions to provide a duration breakdown showing how time is spent in stages and phases of each workflow.

21. The computer readable medium of claim 15, wherein the processor executes the instructions to:
display how queues are being used at any point in time; and
determine which queues are over-utilized and under-utilized.

22. The computer readable medium of claim 15, wherein the processor executes the instructions to determine cluster usage by users, data, resources, and queues.

23. The computer readable medium of claim 15, wherein the processor executes the instructions to provide a status of services running on a big data platform.

24. The computer readable medium of claim 15, wherein the processor executes the instructions to provide a list of applications that have caused inefficiencies such as resource wastage and inefficient join.

25. The computer readable medium of claim 15, wherein the processor executes the instructions to generate a top-N list to show which tables, columns, joins, and queries are used the most.

26. The computer readable medium of claim 15, wherein the processor executes the instructions to identify tables and columns in the workload.

27. The computer readable medium of claim 15, wherein the application is one of a script application, a structured query language (SQL) application, a Not Only (NO) SQL application, a stream application, a search application, and an in-memory application.

28. The computer readable medium of claim 15, wherein the processor executes the instructions to determines if the application is one or more of slow-running, failed, killed, unpredictable, and malfunctioning.

\* \* \* \* \*